United States Patent
Satoh et al.

(10) Patent No.: US 7,783,401 B2
(45) Date of Patent: Aug. 24, 2010

(54) METHOD AND DEVICE FOR MANAGING TASKS OF IN-VEHICLE ELECTRONIC CONTROL UNIT

(75) Inventors: Yohsuke Satoh, Kariya (JP); Seiji Miyamoto, Kariya (JP); Takahiro Shidai, Oobu (JP); Waka Noda, Oobu (JP); Ryo Ito, Toyota (JP); Hiroyuki Hirano, Toyota (JP)

(73) Assignees: Denso Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 345 days.

(21) Appl. No.: 11/889,335

(22) Filed: Aug. 10, 2007

(65) Prior Publication Data

US 2008/0039982 A1 Feb. 14, 2008

(30) Foreign Application Priority Data

Aug. 10, 2006 (JP) .............................. 2006-218624

(51) Int. Cl.
*G06F 7/00* (2006.01)
(52) U.S. Cl. ....................................................... 701/36
(58) Field of Classification Search .................. 701/24, 701/32–33, 36, 48, 53; 718/100, 102, 104, 718/106–107
See application file for complete search history.

(56) References Cited

U.S. PATENT DOCUMENTS

| 6,505,100 | B1 | 1/2003 | Stuempfle et al. |
| 2003/0110202 | A1 | 6/2003 | Shitahaku |
| 2004/0163089 | A1 | 8/2004 | Nishimura |
| 2007/0282880 | A1* | 12/2007 | Cohen et al. ................ 707/101 |

FOREIGN PATENT DOCUMENTS

| JP | H04-322332 | 11/1992 |
| JP | H05-127926 | 5/1993 |
| JP | A-2000-268293 | 9/2000 |
| JP | A-2000-305671 | 11/2000 |
| JP | 2000-353100 | 12/2000 |

(Continued)

OTHER PUBLICATIONS

Muller, Oliver, "Code Generation for Embedded Real-time Middleware Platforms from Service-Oriented Specifications", Masters Thesis in Angewandte Informatik, Mar. 15, 2006.*

(Continued)

*Primary Examiner*—Kim T Nguyen
(74) *Attorney, Agent, or Firm*—Nixon & Vanderhye P.C.

(57) ABSTRACT

A method and device for managing a task upraised according to receiving a processing request of services in in-vehicle electronic control units are provided. The method and device include the steps of: allocating a plurality of services to one task and determining whether or not the task assigned with the service is in process of execution in receiving the processing request of the service; and upraising the task to process the service of the received processing request when determination is made that the task is not in process of execution in the determining step, and making the task in process of execution continuously process the service of the received processing request without newly upraising the task when determination is made that the task is in process of execution in the determining step.

15 Claims, 7 Drawing Sheets

FOREIGN PATENT DOCUMENTS

| JP | 2003-177926 | 6/2003 |
|----|-------------|--------|
| JP | A-2004-252574 | 9/2004 |

OTHER PUBLICATIONS

Extended European Search Report dated Mar. 23, 2009, issued in corresponding European Application No. 07015729.2-2211.

Oliver Müller, "Code Generation for Embedded Real-time Middleware Platforms from Service-Oriented Specifications", Master's Thesis, Technische Universität Munchen, Fakultät Für Informatik, May 31, 2006, pp. 1-107, XP002518733.

Michi Henning et al, "Advanced CORBA Programming with C++", Chapter 11, The Portable Object Adapter, Addison Wesley Longman, Inc., Apr. 1999, pp. 429, 432, 433 and 436, XP002518734.

Japanese Office Action mailed Jul. 22, 2008, issued in counterpart Japanese Application No. 2006-218624, with English translation.

* cited by examiner

SERVICE ALLOCATION TABLE

| SERVICE ID | TASK ID |
|---|---|
| 0xF1 (ENGINE START SERVICE) | 0x01 (ENGINE CONTROL TASK) |
| 0xF2 (REVOLUTION SPEED ACQUISITION SERVICE) | 0x01 (ENGINE CONTROL TASK) |

METHOD AND DEVICE FOR MANAGING TASKS OF IN-VEHICLE ELECTRONIC CONTROL UNIT

CROSS REFERENCES TO RELATED APPLICATION

The present application relates to and incorporates by reference Japanese Patent application No. 2006-218624 filed on Aug. 10, 2006.

BACKGROUND OF THE INVENTION 1. (Field of the Invention)

The present invention relates to a device for task management of in-vehicle electronic control units and a method thereof.

2. (Description of the Related Art)

In a conventional vehicle, overall control of the entire vehicle is realized through distributed processing by electronic control units (ECU) interconnected via an in-vehicle network. In such an in-vehicle network, as a structure to realize a more organic coordination among the electronic control units, introducing remote procedure call (RPC) practically used in the IT field has been considered. The RPC is an interprocess communication protocol for message communications between a client and a server in the client server model in which a received client request (such as a function call) is processed, and the processing result is replied to the client. The RPC is a basic technology of distributed computing.

FIG. 10 shows a model structure of a system in a situation where a message communication function based on the RPC is provided for the vehicle control system. As shown in the figure, ECUs 1 and 2 connected to each other through an in-vehicle network 50 respectively include message communication apparatuses 51, 52. The message communication apparatuses 51, 52 mediate communication of a message (processing request, reply of the processing result thereof or the like) between a client and a server. More specifically, the message communication apparatuses 51, 52 determine the message receiver based on the content of the received message, and sends the message to the message receiver. In reality, functions of the message communication apparatuses 51, 52, clients 53, 54, and a server 55 are respectively realized by software executed on the hardware of the ECU 1 and the ECU 2.

A description will be given of an aspect of a service execution processing in such an in-vehicle control system with reference to the timing chart shown in FIG. 11. In this aspect, the server 55 of the ECU 2 presents service A and service B for the respective clients 53, 54.

As shown in the figure, when the client 54 of the ECU 2 makes a processing request of the foregoing service A, the processing request is sent to the message communication apparatus 52 of the ECU 2. The message communication apparatus 52 performs message receiving processing for upraising (activating) a service for performing the requested processing to upraise the service A presented by the server 55. When the server 55 executes the processing of the upraised service A, the processing result is replied to the client 54 thorough the message communication apparatus 52 again.

Meanwhile, in the figure, slightly after the client 54 makes the processing request of the service A described above, the client 53 of the ECU 1 makes a processing request of the service B. The processing request is firstly received by the message communication apparatus 51 of the ECU 1, and the message receiver is confirmed. After that, the message is sent to the ECU 2. The message communication apparatus 52 of the ECU 2 that receives the message performs message receiving processing to upraise the service B. When the server 55 executes the upraised service B, the processing result is replied to the client 53 thorough the message communication apparatuses 51, 52.

The foregoing service A is executed as a local service call to the server in the ECU same as that of the client. Meanwhile, the foregoing service B is executed as a remote service call to the server in the ECU different from that of the client. However, sending and receiving a message (service processing request, the processing result thereof) between the ECUs is totally responsible for the message communication apparatuses 51, 52, and hidden from the respective clients 53, 54 and the server 55 side. Therefore, the service call can be made regardless of whether local or remote.

When the foregoing communication protocol based on the RPC is employed, the distributed processing system for vehicle control can be easily structured. However, since the following problems therein exist, such a technology is not practically used currently.

In the service execution processing by the message communication function based on the RPC described above, each uprise unit, that is, each task as a unit of reading and executing a processing program is assigned with one service. Tasks are upraised the same number as the number of requested services. Such a structure is effective in order to improve parallel execution characteristics of the functions.

It is demanded of in-vehicle ECUs to be durable for a long time in severe environments such as the environment in the engine room. Thus, compared to general purpose cases, the in-vehicle ECU uses expensive, highly reliable and durable electronic parts, and its setting space is limited. Therefore, the hardware resources thereof are strictly limited. As a result, in the in-vehicle ECU, the overhead in upraising a service (task) such as the memory usage associated with reading a processing program and temporary increase of the CPU load is hardly ignored. When tasks are upraised frequently, the hardware resources are made short, possibly leading to processing stagnation. In the vehicle control system in need of real-time processing, such processing stagnation resulting from lack of resources is crucial.

In the case other than the in-vehicle ECU having the message communication function based on the RPC as described above, processing based on task call may be performed. For example, processing performed commonly by a plurality of controls is managed as a task. Every time the processing is needed, the task is upraised and performed. Thereby, a program code of the common processing is shared to ease the program. However, in this case again, when tasks are upraised frequently, there is a possibility that there is a lack of hardware resources.

SUMMARY OF THE INVENTION

The present invention has been achieved in light of the above-described problems. An object of the invention is to provide a task management device and a task management method of an in-vehicle electronic control unit that can perform processing based on task call with the use of less hardware resources.

To achieve the above-described object, according to an aspect of the invention, in a task management system of an in-vehicle electronic control unit in which a service is processed by upraising (activating) a task allocated with the service according to a received processing request service, a plurality of services are allocated to a single task, a determination means for determining whether or not the task allocated with the service is in process of receiving the processing request of the service is provided, and when the determining means determines that the task allocated with the service is in process of execution, the determining means does not upraise the task corresponding to the received processing request of the service, and makes the task in process of execution process the service continuously.

In the foregoing structure, while processing of a service is executed by a task, when a processing request for another service assigned to the task is received, processing of the service of the newly received processing request is continuously executed by the task in process of execution. That is, a plurality of services can be processed by one-time uprise (activation). Therefore, the uprise frequency is inhibited, and thus overheads due to task uprise are decreased.

To achieve the above-described object, according to an aspect of the invention as a task management method of an in-vehicle electronic control unit, there is provided a method for managing a task upraised according to receiving a processing request of a service in an in-vehicle electronic control unit. The method includes the steps of: allocating a plurality of services to one task, and determining whether or not the task assigned with the service is in process of execution in receiving the processing request of the service; and upraising the task to process the service of the received processing request when determination is made that the task is not in process of execution in the determining step, and making the task in process of execution continuously process the service of the received processing request without newly upraising the task when determination is made that the task is in process of execution in the determining step.

In the foregoing method, in receiving a processing request of a service, when a task allocated with the service is in process of executing processing of another service, the task in process of execution executes the service of the newly received processing request, subsequently to said other service. Therefore, a plurality of services can be executed by one-time uprise. Consequently, the uprise frequency is inhibited, and thus overhead due to task uprise is decreased.

DETAILED DESCRIPTION OF THE PREFERRED EMBODIMENT

Hereinafter, with reference to FIG. 1 to FIG. 9, an embodiment of the present invention will now be explained.

A description will be given of a case applying the present invention to a vehicle control system of a hybrid vehicle including 2 driving sources of an engine and an electric motor. In the vehicle control system, the device and method according to the present invention is functionally reduced into practice as a massage communication apparatus included in an ECU (electronic control unit) mounted in a vehicle, which will be detailed in the following.

In the following description, as a matter of convenience, the vehicle control system is composed of only two ECUs consisting of an engine ECU and a hybrid ECU. In the present control system, only one engine control server provided for the engine ECU is included as a server to present services. The engine control server presents only two services consisting of engine start service for starting the engine and revolution speed acquirement service for acquiring the engine revolution speed (NE) for clients. However the number of ECUs and the number of services are not limited to the foregoing ones, but it is possible to adopt three or more ECUs and three or more services allocated to a single task.

Figure 1:
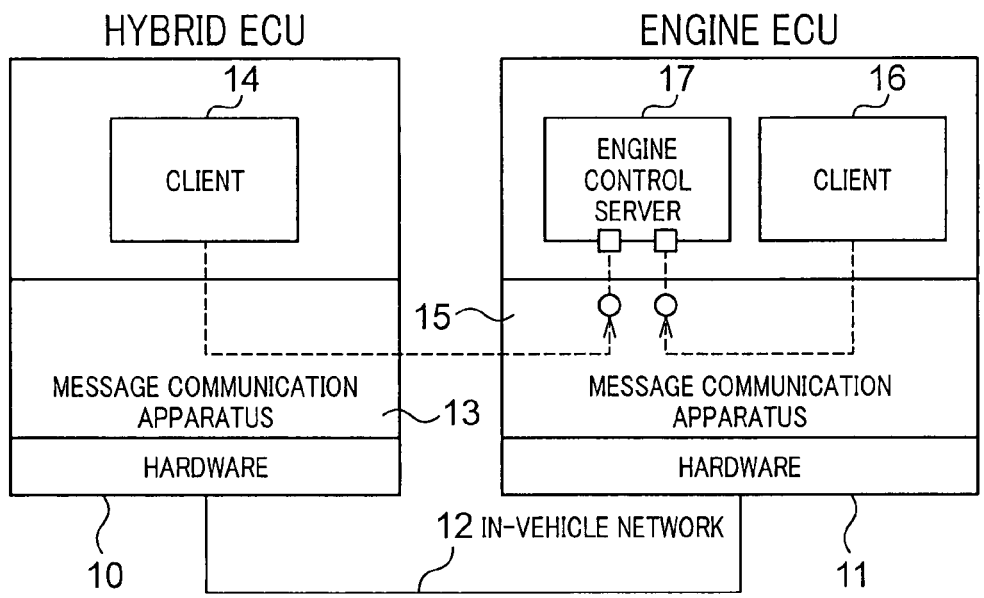
FIG. 1 is a block diagram schematically showing the entire structure of an in-vehicle control system applied to an embodiment of the invention.

First, a description will be given of the entire structure of the vehicle control system. FIG. 1 shows a schematic model structure of the vehicle control system. The vehicle control system is structured as a system to control the vehicle by distributed processing based on remote procedure call (RPC).

As shown in the figure, a hybrid ECU 10 and an engine ECU 11 are connected so that intercommunication in between is available via an in-vehicle network 12. The hybrid ECU 10 responsible for cooperative control between the driving sources of the hybrid vehicle is provided with a message communication apparatus 13 responsible for a message communication function necessary for the foregoing distributed processing based on the RPC. The message communication apparatus 13 functionally includes the task control device according to the present invention.

In addition, in the hybrid ECU 10, a client 14 for performing various processing in relation to the cooperative control is activated. Meanwhile, the engine ECU 11 responsible for engine control is also provided with a message communication apparatus 15, which also functionally includes the task control device according to the present invention.

In addition, in the engine ECU 11, a client 16 for performing various processing in relation to the engine control and an engine control server 17 for presenting the foregoing 2 services for the clients 14, 16 are activated. The message communication apparatus 15 of the engine ECU 11 is responsible for the foregoing message communication function, and is also responsible for processing in relation to calling the services presented by the engine control server 17. In reality, the functions of the foregoing message communication apparatuses 13, 15; the clients 14, 16; and the engine control server 17 are respectively realized by software executed on the hardware of each ECU.

Figure 2:
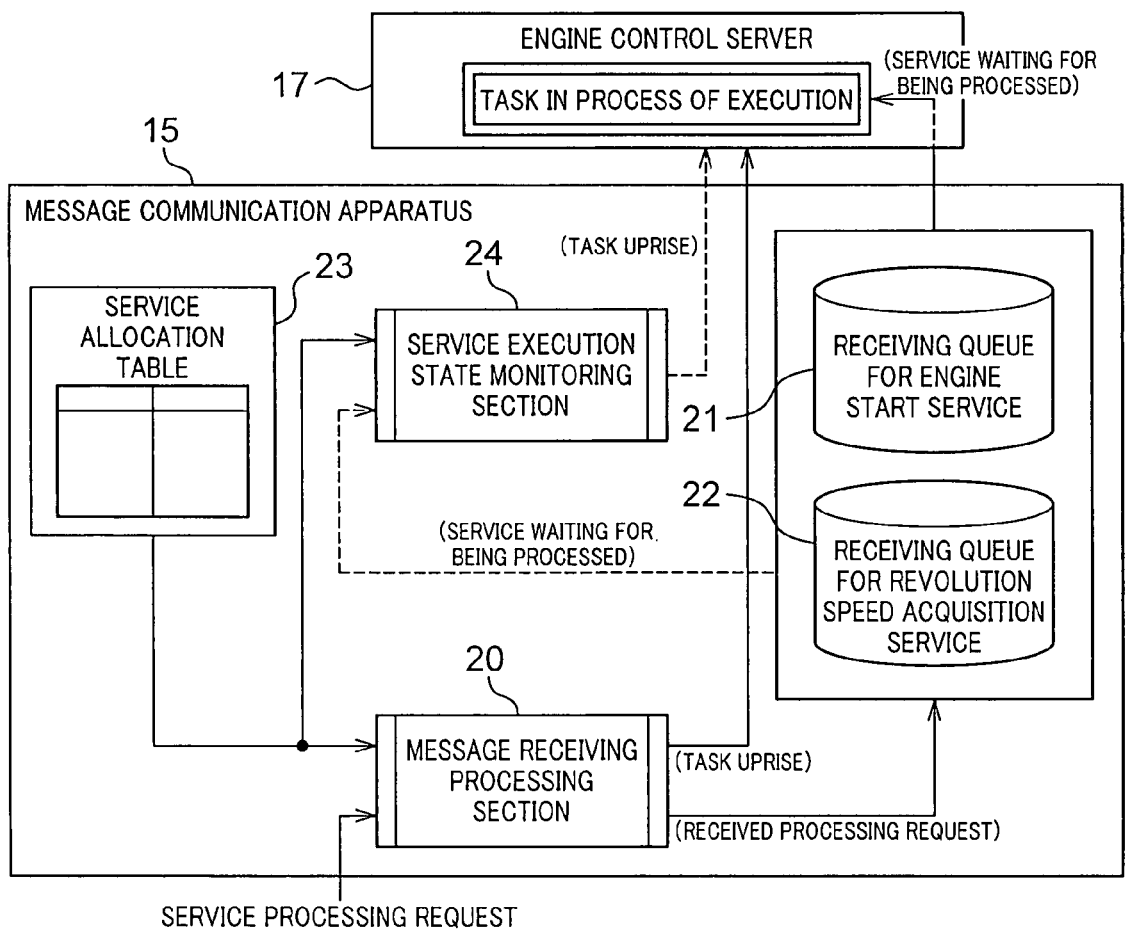
FIG. 2 is a block diagram schematically showing an internal structure of a message communication apparatus of an engine ECU of the in-vehicle control system.

Subsequently, a description will be given of the foregoing message communication apparatus 15 of the engine ECU 11 in detail with reference to FIG. 2. In this embodiment, a task management device and a task management method according to the invention are applied to the message communication apparatus 15. FIG. 2 is a block diagram that schematically shows a correlation among components in relation to service calls of the message communication apparatus 15.

In this embodiment, the service as a unit of a processing request by a client and a task as a unit of uprising (i.e., activating) and executing a server process corresponding to the processing request are separately managed. Except for services necessitating high real time characteristics, a single task is allocated with a plurality of services. For example, both the foregoing engine start service and the foregoing engine revolution speed acquirement service are allocated to the engine control task. That is, for the both processing requests of the engine start service and the revolution speed acquirement service, the engine control task is upraised from the engine control server 17. In addition, in the present embodiment, a plurality of services assigned to the identical task are processed in the identical upraised task. Thereby, the frequency of task uprise (i.e., activation) is inhibited, and thus overheads due to the task uprise are decreased.

As shown in FIG. 2, the message communication apparatus 15 of the engine ECU 11 is provided with a message receiving processing section 20, receiving queues 21, 22 respectively for the engine start service and the revolution speed acquiring service, a service allocation table 23, and a service execution state monitoring section 24. The message receiving processing section 20 receives a service processing request message from the clients 14, 16, and executes processing for uprising a task assigned with the requested service. The receiving queues 21, 22 are buffers to store the respective service processing request messages received by the message receiving processing section 20 until the processing for the message is started.

Figures 3, 4:
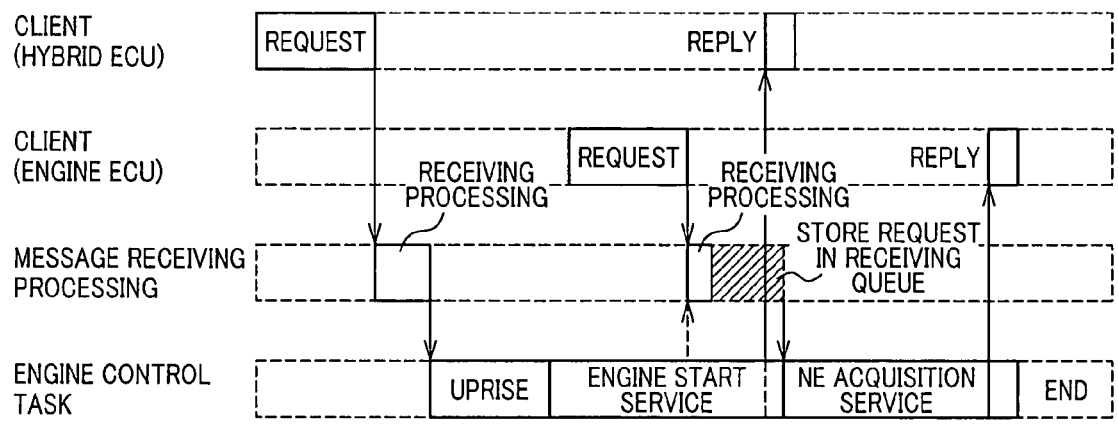
FIG. 3 is a diagram showing an example of a service allocation table provided for the message communication apparatus.
FIG. 4 is a timing chart showing an example of service execution processing in this embodiment.

The service allocation table 23 is a data table in which a service identification number (ID) is a key item and an ID of a task assigned with each service is a data item. The service allocation table 23 is used for examining the task assigned with the service. In this embodiment, the service allocation table 23 is structured as shown in FIG. 3. In such a table, "0x01" is set as the ID of the engine control task, "0xF1" is set as the ID of the engine start service, and "0xF2" is set as the ID of the revolution speed acquirement service respectively. For the task IDs, sequential numbers starting from "0x01" are assigned. For the service IDs, sequential numbers starting from "0xF1" are assigned. Where "*" is a given numerical value from "0" to "F" in hexadecimal ("15" in decimal), "0x" represents a numerical value "" in hexadecimal.

The service execution state monitoring section 24 monitors presence of a service that is unprocessed and neglected in spite of a processing request being made. When determining that the neglected service exists, the service execution state monitoring section 24 executes a task to uprise the task assigned with the neglected service. Details of the service execution state monitoring section 24 will be described later.

Next, a description will be given of details of service execution processing in the message communication apparatus 15 structured as above with reference to FIG. 4. FIG. 4 shows an example of aspects of the service execution processing by the message communication apparatus 15.

In the figure, first, the client 14 of the hybrid ECU 10 makes a processing request of the engine start service. When the message receiving processing section 20 receives a message of the processing request, the message receiving processing section 20 executes message receiving processing. In the message receiving processing, the message receiving processing section 20 stores the received message in the receiving queue 21. Further, the message receiving processing section 20 checks the task (engine control task) allocated with the requested service (engine start service) with reference to the service allocation table 23, and upraises the task. The engine control task upraised in the engine control server 17 reads the message from the receiving queue 21, and performs processing of the engine start service.

In the figure, subsequently to the foregoing processing request of the engine start service made by the client 14, a processing request of the revolution speed acquisition (NE) service is made by the client 16 of the engine ECU 11. For the processing request, the message receiving processing section 20 executes message receiving processing, stores the message in the receiving queue 22, and checks the task assigned with the requested service. However, at that time, the engine control task assigned with the requested revolution speed acquisition service has already been upraised by the previous processing request of the engine start service. Therefore, the message receiving processing section 20 does not uprise the task, and simply stores the message in the receiving queue 22 to finish the message receiving processing. After the engine control task finishes the processing of the previously requested engine start service and sends the processing result to the client 14, the engine control task reads the message from the receiving queue 22. Then, the engine control task performs processing of the revolution speed acquirement service, and sends the processing result to the client 16. Thereby, the 2 services of the engine start service and the revolution speed service are processed by upraising the engine control task once.

Figure 5:
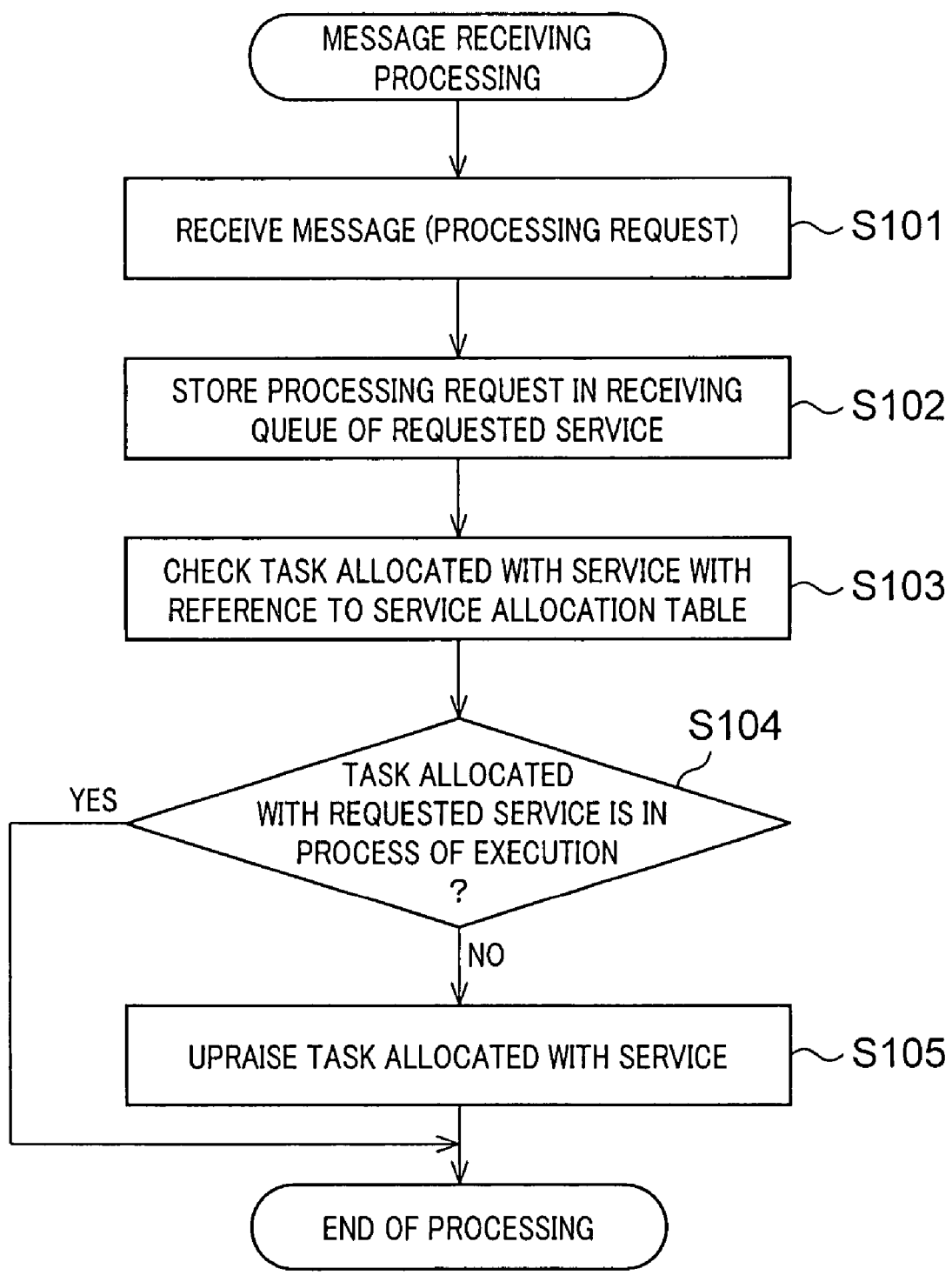
FIG. 5 is a flowchart of message receiving processing employed in this embodiment.

Subsequently, a description will be given of details of the foregoing message receiving processing of the message receiving processing section 20. FIG. 5 is a flowchart showing a processing procedure of the message receiving process. The processing is executed by the message receiving processing section 20 every time when a service processing request message is received.

When the message receiving processing section 20 receives the service processing request message (S101 in FIG. 5), first, the message receiving processing section 20 stores the message in the receiving queue 21 or 22 corresponding to each service (S102).

Subsequently, the message receiving processing section 20 checks the task allocated with the requested service with reference to the service allocation table 23 (S103). Then, the message receiving processing section 20 determines whether or not the task is in process of execution (S104). More specifically, the message receiving processing section 20 acquires the ID of the task allocated with the service with the requested processing from the service allocation table 23, and compares the acquired ID to the ID of the task currently in process of execution. When the ID identical with the acquired ID of the task exists in the tasks currently in process of execution (S104: YES), the message receiving processing section 20 finishes the current processing. Meanwhile, when the ID identical with the acquired ID of the task does not exist in the tasks currently in process of execution, the message receiving processing section 20 interrupts the engine control server 17, and upraises the task allocated with the service with the requested processing (S105).

Figure 6:
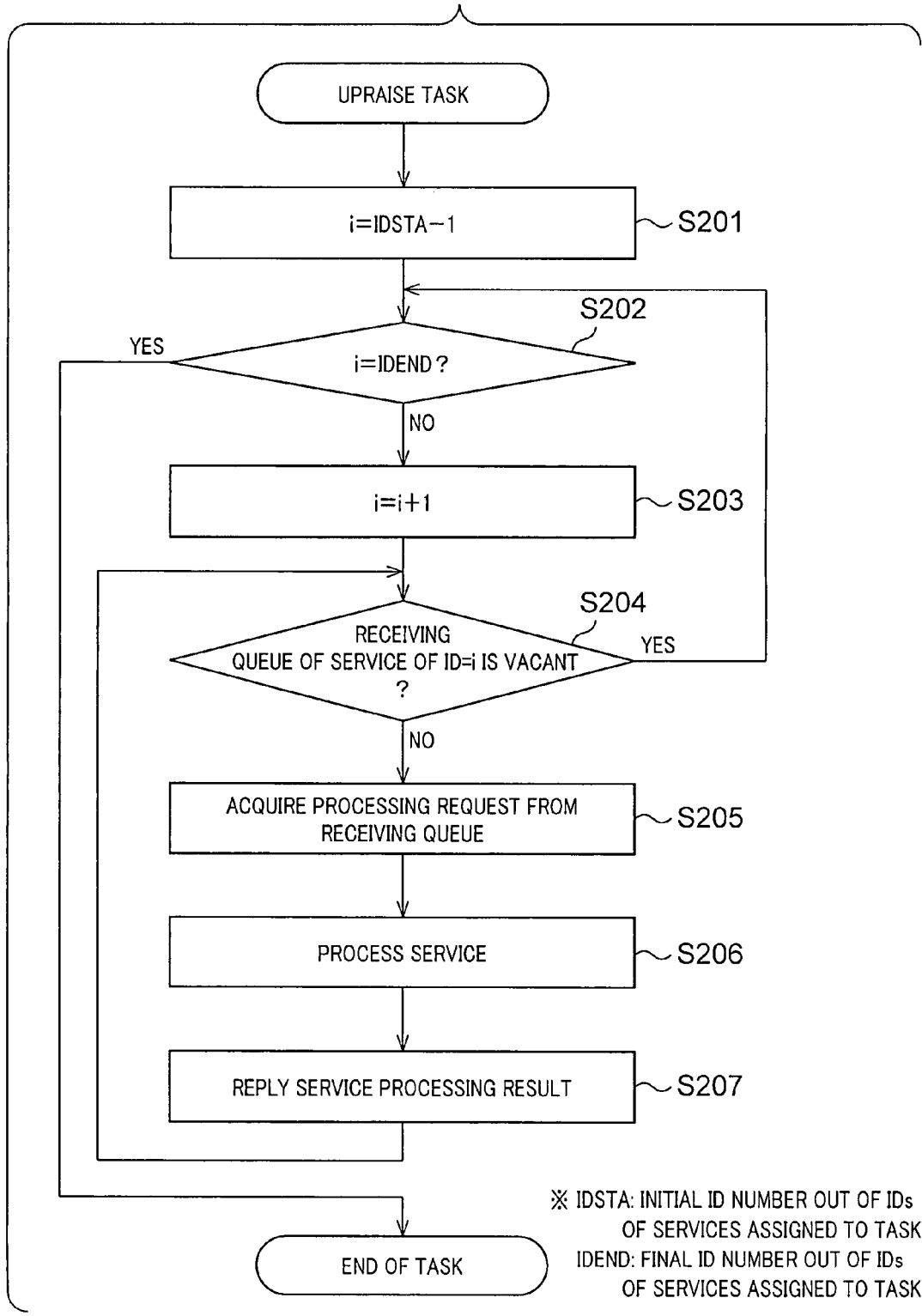
FIG. 6 is a flowchart of a service execution processing routine of a task employed in this embodiment.

Next, a description will be given of a processing routine of service execution processing of the task upraised through the foregoing message receiving processing. FIG. 6 shows a processing routine of the task from when the task is upraised until when the task is finished. The processing routine is executed concurrently with starting task uprise by the processing of step S105 of the foregoing message receiving processing.

Through the processing of steps S201 to S204, while the uprised task scans the receiving queues in ascending order of the IDs of the services assigned to the task, the uprised task checks whether or not a receiving queue that is not vacant, that is, a receiving queue in which a message is stored exists. The constant number "IDSTA" shown in step S201 in the figure represents the first number of the ID of the service assigned to the task. The constant number "IDEND" shown in step S203 in the figure represents the last number of the ID of the service assigned to the task. For example, in the case of the engine control task assigned with the engine start service with the ID of "0xF1" and the revolution speed acquisition service with the ID of "0xF2," "IDSTA" is "0xF1," and "IDEND" is 0xF2.

Every time when the task determines that a receiving queue in which a message is stored exists (S204: NO), the task acquires the processing request message from the receiving queue (S205), and executes processing of the service requested by the message (S206). Then, the task sends the result of the executed processing to the client (S207). After that, the task rechecks whether or not a receiving queue that is not vacant exists. When the task determines that all receiving queues are vacant, the task finishes itself. That is, in the case that the task is once uprised, even after the task completes the processing of the service calling the task, the task checks whether or not other processing request of a service assigned to the task exists. If such a processing request exists, the task continues to execute the processing of the service.

As described above, in this embodiment, a plurality of services are assigned to one task, and the plurality of services assigned to the identical task are processed in the uprised identical task. Thereby, the uprise frequency is inhibited, and thus overhead due to task uprise is decreased. Therefore, the processing based on the task call in the distributed processing of vehicle control with the use of the message communication function based on the RPC can be performed with less hardware resources.

Figure 7:
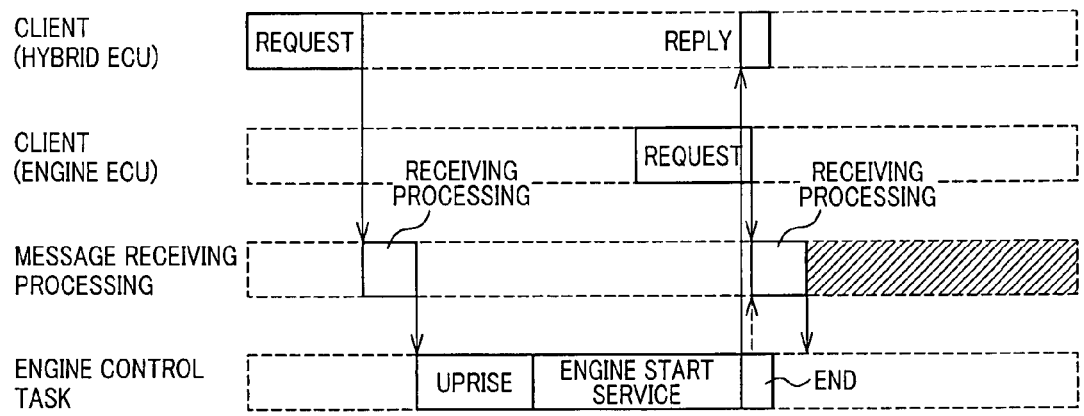
FIG. 7 is a timing chart showing an example of service execution processing in the case that a service execution state monitoring section does not exist.

However, in the foregoing processing aspect, though the probability is low, there is a possibility that processing of a requested service is not executed and neglected. FIG. 7 shows a state that such an event occurs. As described above, at the time that the task completes the processing service, the task finishes itself if determining that other service processing request assigned to the task itself does not exist (S202: YES in FIG. 6). A slight time lag exists between the time when the foregoing determination is made and the time when the task is finished. In such a time lag, in spite that determination is already made inside the task that the task is to be finished, the task appears to be in process of execution when seen from the outside. When message receiving processing is performed in such a time lag, the processing of the service thereof is not performed.

For example, in FIG. 7, when the engine control task which has finished processing of the engine start service is waiting to finish itself, message receiving processing for a processing request of the revolution speed acquisition service made by the client 16 is performed. In this case, when seen from the message receiving processing section 20, the engine control task appears to be in process of execution. Therefore, the message receiving processing section 20 does not uprise the task and finishes the message receiving processing. However, the engine control task has already started to finish itself. Thus, the message stored in the receiving queue 22 in the message receiving processing is neglected by the task. In result, the message continues to be stored in the receiving queue 22 until the engine control task is uprised again by another processing request.

Therefore, in this embodiment, the foregoing service execution state monitoring section 24 gives aid to the processing request neglected with the service unprocessed. More specifically, the service execution state monitoring section 24 is permanently allocated in the message communication apparatus 15 as a task. The service execution state monitoring section 24 regularly checks receiving queues, and monitors whether or not a processing request message neglected with the service unprocessed exists. When the service execution state monitoring section 24 determines that such a neglected message exists, the service execution state monitoring section 24 uprises the task assigned with the service with the processing requested by the message.

Figure 8:
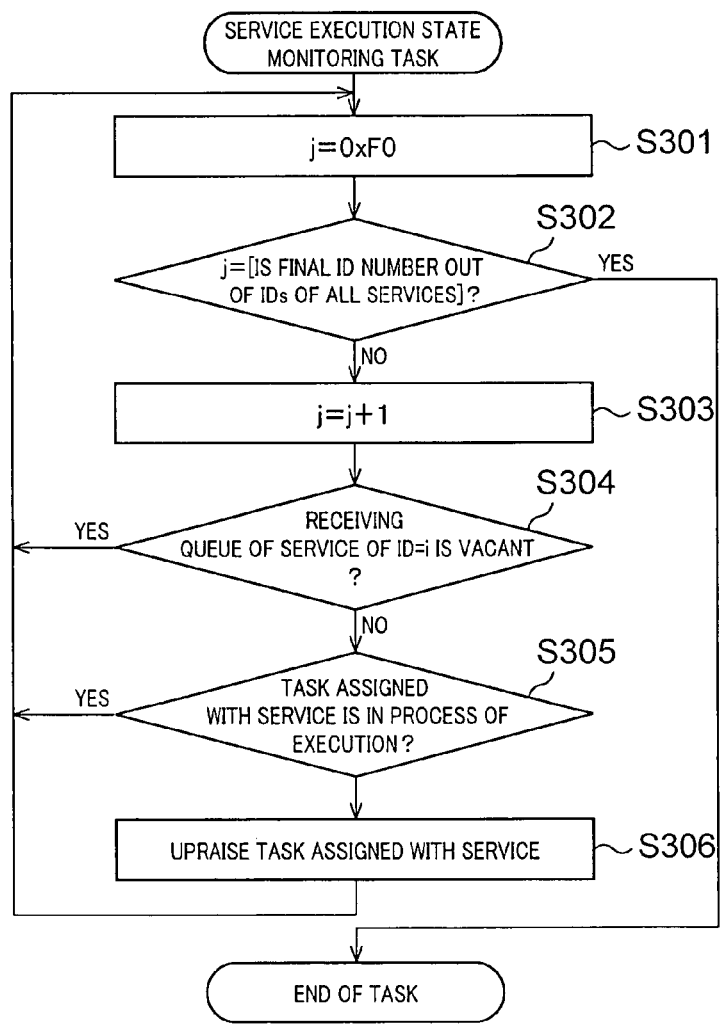
FIG. 8 is a flowchart of service execution state monitoring processing employed in this embodiment.

A description will be given of details of the foregoing processing of the service execution state monitoring section 24. FIG. 8 shows a flowchart of service execution state monitoring processing performed by the service execution state monitoring section 24. The service execution state monitoring section 24 periodically executes such processing as regular interrupt processing.

When such processing is started, through the processing of steps S301 to S305, while the service execution state monitoring section 24 scans all receiving queues provided in the message communication apparatus 15 in ascending order of the IDs of the services, the service execution state monitoring section 24 checks whether or not a service processing request message neglected as above exists. More specifically, when a processing request message is stored in a receiving queue (S304: NO), and when the task assigned with the service thereof is not in process of execution (more strictly, including a term of receiving processing of the service processing request) (S305: NO), the service execution state monitoring section 24 determines that the processing request of the message stored in the receiving queue is neglected as described above.

Every time when the service execution state monitoring section 24 determines that the neglected processing request message exists, the service execution state monitoring section 24 uprises the task assigned with the service with the processing requested by the message (S306). After the service execution state monitoring section 24 continues to perform the foregoing processing until when the service execution state monitoring section 24 determines that such a message does not exist in any receiving queue, the service execution state monitoring section 24 once finishes the processing.

Figure 9:
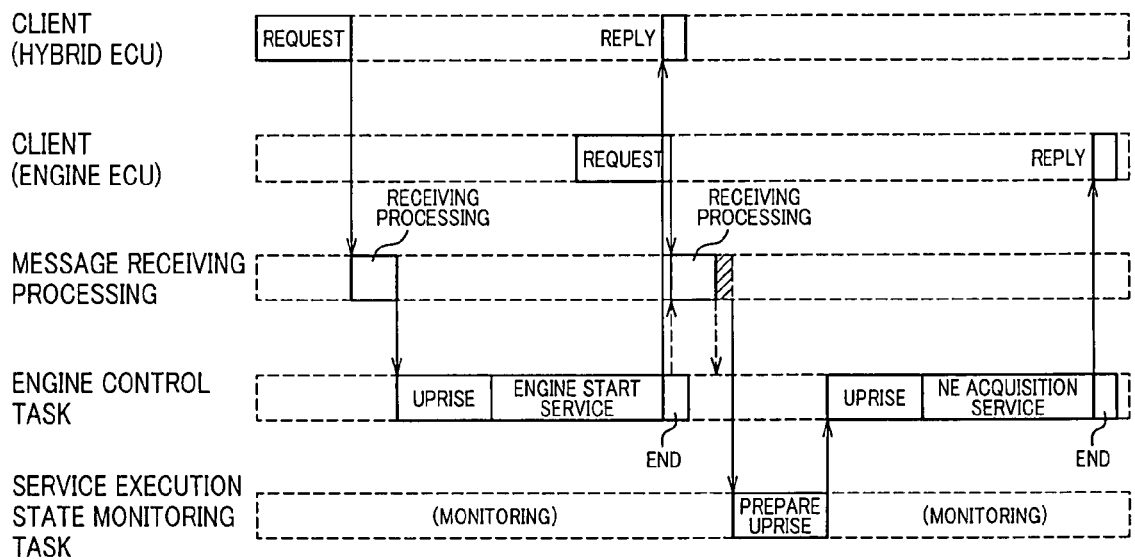
FIG. 9 is a timing chart showing an example of service execution processing in this embodiment in the case that a service execution state monitoring section is provided.
Figure 10:
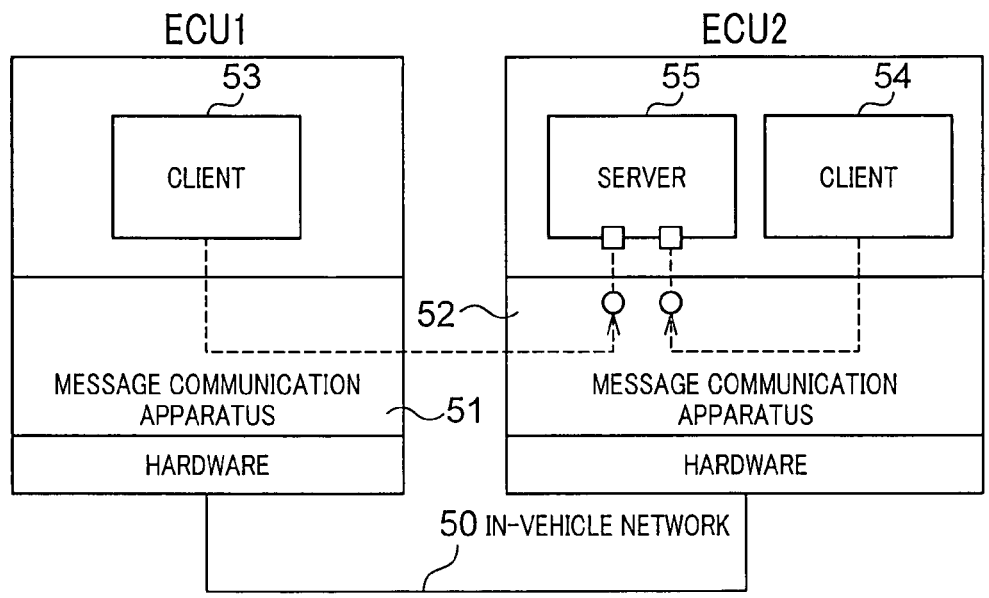
FIG. 10 is a block diagram schematically showing an example of a conventional structure of an in-vehicle control system based on RPC.
Figure 11:
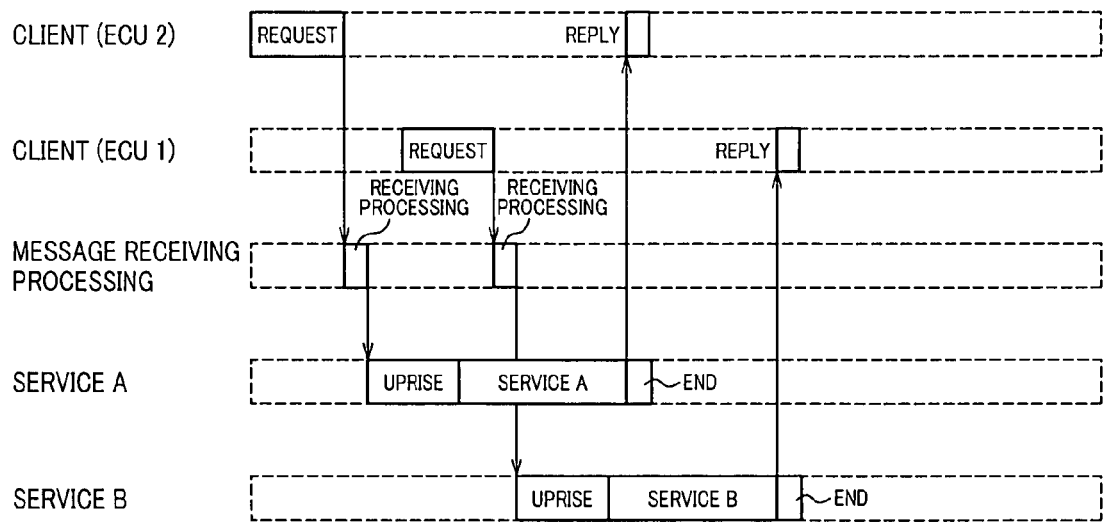
FIG. 11 is a timing chart showing an example of conventional service execution processing in the in-vehicle control system in FIG. 10.

FIG. 9 shows an example of an aspect of the foregoing processing of the service execution state monitoring section 24. In the same manner as in the state of previous FIG. 7, in the figure, when the engine control task is waiting for finishing itself, message receiving processing for a processing request of the revolution speed acquisition service made by the client 16 is performed. Therefore, the processing request message of the revolution speed acquisition service continues to be stored in the receiving queue 22 and is neglected. However, if the foregoing service execution state monitoring section 24 exists, such a neglected message is detected and the engine control task is uprised again. In result, the processing of the revolution speed acquisition service can be executed.

When the task management device and the task management method of this embodiment are practically employed to the vehicle control system, more ECUs are provided for the system, and a plurality of ECUs have the server function presenting services. Further, more services and more tasks are needed. In such a case, by applying a structure similar to the foregoing message communication apparatus 15 of the engine ECU 11 or a structure basically based thereon to other ECU having the server function, a system for performing vehicle control by distributed processing based on the RPC that works with less resources can be structured.

In the foregoing structure, the services can be freely allocated to a task. According to the setting of the service allocation, the system can be operated flexibly. For example, when a plurality of services are allocated to a single task, processing of a service may be delayed until processing of the previous service is finished. Therefore, a service necessitating the real time characteristics is preferably singly assigned to one task. In addition, it is available to operate the system according to each resource state of each ECU. For example, in an ECU with the comparatively abundant resources, the ratio of a task allocated with only a single service may be increased. Meanwhile, in an ECU without the abundant resources, the ratio of a task allocated with a plurality of services may be increased.

In the foregoing embodiment, the foregoing processing of the determining means is performed with the use of the processing of steps S103, S104 of FIG. 5 by the message receiving processing section 20. Further, the receiving queues 21, 22 correspond to the foregoing storing means, and the service execution state monitoring section 24 corresponds to the foregoing service execution state monitoring means.

In this embodiment, the following effects can be obtained.

(1) In this embodiment, a plurality of services are assigned to a single task, and the plurality of services assigned to the identical task are processed in the identical task uprised. Thereby, the task uprise frequency is inhibited, and thus overhead due to the task uprise can be decreased. Therefore, the processing based on the task call in the distributed processing based on the RPC can be performed with less hardware resources.

(2) By using the service allocation table 23, the relation between a service and a task can be easily and immediately confirmed.

(3) In this embodiment, a received service processing request message is stored in the receiving queues 21, 22. In addition, a task itself refers to the receiving queues 21, 22 to check the presence of other processing request assigned to the task itself. Therefore, a plurality of services can be continuously executed by the identical task with the use of the simple processing structure.

(4) The service execution state monitoring section 24 checks presence of a neglected service processing request waiting for being processed, and if necessary, uprises a task. Therefore, the service can be avoided from being unprocessed and neglected.

(5) Task allocation can be freely set. Therefore, the system can be flexibly operated according to each resource state of each ECU and each service usage mode.

The foregoing embodiment may be modified as follows.

The service execution state monitoring section 24, its task, and its processing may be omitted. In this case, services can be avoided from being unprocessed and neglected by other method such as the foregoing time lug elimination in finishing a task.

In the foregoing embodiment, checking the service processing request waiting for being processed and determining whether or not a plurality of services are to be continuously executed are performed as processing inside a task. However, such processing may be performed by other means separately provided outside the task.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

What is claimed is:

1. A device for managing tasks assigned to a server mounted in a vehicle, the server being communicably connected to clients mounted in the vehicle and activating the tasks to respond to a plurality of services requested from the clients in order to control the vehicle, the device comprising:
    a table that memorizes a correspondence between the plurality of services and the tasks, wherein two or more services among the a plurality of services are allocated to at least one of the tasks,
    a receiving block that receives a request for a service requested by any of the clients as one of the plurality of services;
    a determining block that makes reference to the table to determine whether or not the task allocated to the requested service newly received by the receiving block is currently in execution for a requested service received before the requested service is newly received; and
    an allowing block that allows the task currently in execution to i) perform processing of the requested service received before the requested service is newly received and, thereafter, to ii) continuously perform processing of the requested service newly received, when the determining block determines that the task allocated to the requested service newly received is currently in execution.

2. The device of claim 1, wherein
the receiving block comprises a memory in which information indicating requests for the services is stored and
the allowing block comprises:
examining means for examining whether or not the memory of the receiving block stores therein the information indicating the requested service newly received; and
task managing means for managing the task by performing the task assigned to the requested service stored in the memory when the examining means examines that the memory stores therein the information indicating the request for processing the service newly received and by ending the task unless the examining means examines that the memory stored therein the information indicating the request for processing the service newly received.

3. The device of claim 2, wherein
the table is configured to memorize both the plurality of services each identified by a piece of identification information and the task identified by the piece of identification information; and
the determining block is configured to make reference to the table to i) acquire the identification information of the task allocated to the requested service through checking the pieces of identification information of the plurality of services and to ii) make a comparison between the acquired identification information and identification information of the task currently in execution, a compared result being reflected in the determination.

4. The device of claim 3, wherein
the server and each of the clients are produced as electronic control units mounted in the vehicle,
the task managing device is implemented in one of the electronic control units and the electronic control unit in which the server is implemented has a function of performing a message communication based on remote procedure call (RPC) and is configured to use the function of performing the message communication in order to perform communication with the other electronic control units mounted in the vehicle.

5. The device of claim 3, further comprising:

a monitoring block that monitors at intervals whether or not the memory stores therein information indicating a new request for a service other than the service allocated to the task that has been ended, the service newly requested also being allocated to the same task that has been ended; and a further task managing block that activates once-ended task again when the monitoring block determines that the memory stores therein the information indicating the new request for the service.

6. The device of claim 2, further comprising:

a monitoring block that monitors at intervals whether or not the memory stores therein information indicating a new request for a service other than the service allocated to the task that has been ended, the service newly requested also being allocated to the same task that has been ended; and a further task managing block that activate the once-ended task again, when the monitoring block determines that the memory stores therein the information indicating the new request for the service.

7. The device of claim 6, wherein the server and each of the clients are produced as electronic control units mounted in the vehicle, the task managing device is implemented in one of the electronic control units and the electronic control unit in which the server is implemented has a function of performing a message communication based on remote procedure call (RPC) and is configured to use the function of performing the message communication in order to perform communication with the other electronic control units mounted in the vehicle.

8. The device of claim 2, wherein the server and each of the clients are produced as electronic control units mounted in the vehicle, the task managing device is implemented in one of the electronic control units and the electronic control unit in which the server is implemented has a function of performing a message communication based on remote procedure call (RPC) and is configured to use the function of performing the message communication in order to perform communication with the other electronic control units mounted in the vehicle.

9. The device of claim 1, wherein the server and each of the clients are produced as electronic control units mounted in the vehicle the task managing device is implemented in one of the electronic control units and the electronic control unit in which the server is implemented has a function of performing a message communication based on remote procedure call (RPC) and is configured to use the function of performing the message communication in order to perform communication with the other electronic control units mounted in the vehicle.

10. A device for managing tasks assigned to a server mounted in a vehicle, the server being communicably connected to clients mounted in the vehicle and activating the tasks to respond to a plurality of services requested from the clients in order to control the vehicle, the device comprising:

a table that memorizes a correspondence between the plurality of services and the tasks, wherein two or more services among the a plurality of services are allocated to at least one of the tasks, receiving means for receiving a request for a service requested by any of the clients as one of the plurality of services;

determining means for making reference to the table to determine whether or not the task allocated to the requested service newly received by the receiving means is currently in execution for a requested service received before the requested service is newly received; and processing continuing means for allowing the task currently in execution to i) perform processing of the requested service received before the requested service is newly received and, thereafter, to ii) continuously perform processing of the requested service newly received, when the determining means determines that the task allocated to the requested service newly received is currently in execution.

11. The device of claim 10, wherein the server and each of the clients are produced as electronic control units mounted in the vehicle, the task managing device is implemented in one of the electronic control units and the electronic control unit in which the server is implemented has a function of performing a message communication based on remote procedure call (RPC) and is configured to use the function of performing the message communication in order to perform communication with the other electronic control units mounted in the vehicle.

12. A method of managing tasks assigned to a server mounted in a vehicle, the server being communicably connected to clients mounted in the vehicle and activating the tasks to respond to a plurality of services requested from the clients in order to control the vehicle the method comprising steps of:

receiving a processing request for a service requested by any of the clients, the requested service being among the plurality of services;

making reference to a table to determine whether or not the task allocated to the requested service newly received is currently in execution for a requested service received before the requested service is newly received, wherein the table memorizes a correspondence between the plurality of services and the tasks, two or more services among the plurality of services being allocated to at least one of the tasks; and allowing the task currently in execution i) to perform processing of the requested service received before the requested service is newly received and, thereafter, to ii) continuously perform processing of the requested service newly received, when it is determined that the task allocated to the requested service newly received is currently in execution.

13. The method of claim 12, wherein the receiving step uses a memory into which information indicating requests for the services is stored and the allowing step comprising steps of:

examining whether or not the memory stores therein the information indicating the requested service newly received; and managing the task by performing the task assigned to the requested service stored in the memory when the examining step examines that the memory stores therein the information indicating the request for processing the service newly received and by ending the task unless the examining step examines that the memory stored therein the information indicating the request for processing the service newly received.

14. The method of claim 13, wherein the table memorizes both the plurality of services each identified by a piece of identification information and the task identified by the piece of identification information and the determining step makes reference to the table to i) acquire the identification information of the task allocated to the requested service through checking the pieces of identification information of the plurality of services and ii) to make a comparison between the acquired identification information and identification information of the task currently in execution, a compared result being reflected in the determination.

15. The method of claim 13, further comprising steps of:

monitoring at intervals whether or not the memory stores therein information indicating a new request for a service other than the service allocated to the task that has been ended, the service newly requested also being allocated to the same task that has been ended; and activating the once-ended task again when the monitoring means determines that the memory stores therein the information indicating the new processing request for the service.

* * * * *